(12) United States Patent
Sørensen

(10) Patent No.: US 10,330,330 B2
(45) Date of Patent: Jun. 25, 2019

(54) SYSTEM AND METHOD FOR CLIMATE CONTROL IN A BUILDING

(71) Applicant: SCHNEIDER ELECTRIC DANMARK A/S, Ballerup (DK)

(72) Inventor: John Sørensen, Køge (DK)

(73) Assignee: Schneider Electric Denmark A/S, Ballerup (DK)

( * ) Notice: Subject to any disclaimer, the term of this patent is extended or adjusted under 35 U.S.C. 154(b) by 192 days.

(21) Appl. No.: 14/783,962

(22) PCT Filed: Apr. 11, 2014

(86) PCT No.: PCT/DK2014/050093
§ 371 (c)(1),
(2) Date: Oct. 12, 2015

(87) PCT Pub. No.: WO2014/169919
PCT Pub. Date: Oct. 23, 2014

(65) Prior Publication Data
US 2016/0047567 A1 Feb. 18, 2016

(30) Foreign Application Priority Data
Apr. 15, 2013 (EP) .................................... 13163756

(51) Int. Cl.
*F24F 3/044* (2006.01)
*F24F 11/62* (2018.01)
(Continued)

(52) U.S. Cl.
CPC ............ *F24F 3/0442* (2013.01); *F24F 11/30* (2018.01); *F24F 11/62* (2018.01); *F24F 11/70* (2018.01);
(Continued)

(58) Field of Classification Search
CPC .... F24F 11/006; F24F 3/0442; F24F 11/0012; F24F 11/0076; F24F 11/0086;
(Continued)

(56) References Cited

U.S. PATENT DOCUMENTS 7,386,988 B1 * 6/2008 Petschauer ............ F24F 5/0071
236/44 R
8,190,273 B1 5/2012 Federspiel et al.
(Continued)

FOREIGN PATENT DOCUMENTS

WO 1999/22284 A1 5/1999
WO 2006/055334 A1 5/2006
WO 2010/039691 A2 4/2010

*Primary Examiner* — Robert E Fennema
*Assistant Examiner* — Jigneshkumar C Patel
(74) *Attorney, Agent, or Firm* — Fox Rothschild LLP; Carol E. Thorstad-Forsyth

(57) ABSTRACT

A method for controlling a climate parameter in a room of a building, the method comprising obtaining information regarding the climate parameter, the information including room specific measurements of the climate parameter during at least one climate control process, based on the room specific measurements of the climate parameter providing or amending a correspondence indicator CI, such that the correspondence indicator comprises information indicative of a rate of change of the climate parameter within the at least one room during the at least one climate control process, obtaining climate setting information including a desired climate parameter value C and a corresponding desired time $t_1$, obtaining a starting value $V_1$ of the climate parameter of the at least one room, based on the correspondence indicator CI, the desired time $t_1$, the starting value $V_1$ and the desired climate parameter value $C_1$ calculating a measure $M_1$ for an amount of time $\Delta t$ needed to 1 change the climate parameter from the starting value $V_1$ of the climate parameter to the desired climate parameter value $C_1$, and (Continued)

scheduling a second climate control process of the climate parameter of the at least one room as a function $F_1$ of the measure $M_1$.

17 Claims, 6 Drawing Sheets

(51) Int. Cl.

| | | |
|---|---|---|
| *F24F 11/30* | (2018.01) | |
| *F24F 11/70* | (2018.01) | |
| *G05B 15/02* | (2006.01) | |
| *G05D 23/19* | (2006.01) | |
| *F24F 11/47* | (2018.01) | |
| *F24F 11/61* | (2018.01) | |
| *F24F 11/64* | (2018.01) | |
| *F24F 11/56* | (2018.01) | |
| *F24F 110/10* | (2018.01) | |
| *F24F 110/12* | (2018.01) | |
| *F24F 140/60* | (2018.01) | |

(52) U.S. Cl.
CPC ......... *G05B 15/02* (2013.01); *G05D 23/1917* (2013.01); *F24F 11/47* (2018.01); *F24F 11/56* (2018.01); *F24F 11/61* (2018.01); *F24F 11/64* (2018.01); *F24F 2110/10* (2018.01); *F24F 2110/12* (2018.01); *F24F 2140/60* (2018.01)

(58) Field of Classification Search
CPC ....... F24F 2011/0013; F24F 2011/0047; F24F 2011/0063; F24F 2011/0068; F24F 2011/0073; F24F 2011/0094; G05D 23/1917; G05B 15/02
USPC ........................................................ 700/276
See application file for complete search history.

(56) References Cited

U.S. PATENT DOCUMENTS

| | | | |
|---|---|---|---|
| 8,554,376 B1* | 10/2013 | Matsuoka | H04L 12/2825 236/46 R |
| 2007/0228183 A1* | 10/2007 | Kennedy | F24F 11/0012 236/1 C |
| 2010/0318227 A1* | 12/2010 | Steinberg | F24F 11/006 700/278 |
| 2013/0274928 A1* | 10/2013 | Matsuoka | G05D 23/1904 700/276 |

* cited by examiner

SYSTEM AND METHOD FOR CLIMATE CONTROL IN A BUILDING

CROSS-REFERENCE TO RELATED APPLICATIONS

This application is the U.S. national phase application of PCT International Application No. PCT/DK2014/050093 filed Apr. 11, 2014, which claims priority to European Patent Application No. 13163756.3 filed Apr. 15, 2013, the contents of such applications being incorporated herein by reference.

FIELD OF THE INVENTION

The present invention relates to a method for controlling at least one climate parameter, including a first climate parameter, in at least one room of a building. The present invention further relates to a corresponding system for controlling at least one climate parameter, including a first climate parameter, in at least one room of a building.

As used herein the term "building" is intended to cover all possible types of buildings, whether private such as houses, terraced houses, separate flats or blocks of flats, public such as town halls or libraries or industrial such as factories or office domiciles, or indeed even combinations of the above such as a high-rise building housing both offices and private homes.

Likewise, the term "room" as used herein is intended to cover all types of rooms irrespective of their use, such as bathrooms, bedrooms, offices, living rooms, factory halls and so forth. Similarly, as used herein the term "at least one room" is intended to cover both the possibility that the method and system according to the invention is employed to control at least one climate parameter of just one specific room of a building and the possibility that the method and system according to the invention is employed to control at least one climate parameter of two or more specific rooms, and particularly all rooms, of a building independently (and/or in dependence) of one another.

Furthermore, as used herein the term "climate parameter" is intended to cover any parameter related to the climate in a specific room of a building, including but not limited to the air temperature within the at least one room and the air humidity within the at least one room.

Such a climate parameter may be changed both by increasing the value of the parameter, e.g. by heating of the at least one room, and by decreasing the value of the parameter, e.g. by cooling of the at least one room. Hence, terms such as "controlling at least one climate parameter" and "climate control process" and the like as used herein is intended to encompass increasing and/or decreasing the value of a climate parameter in a controlled manner.

Also, the term "appliance" as used herein is intended to cover any appliance which may be present in a given building, including both electrical appliances, such as ovens, refrigerators, lamps, computers etc. and non-electrical appliances such as e.g. gas stoves and wood stoves.

Finally, the term "energy price" as used herein is intended to cover the price of any relevant energy source, such as e.g. electricity, water, oil, gas or the like, which may be used for heating the at least one room of the building.

BACKGROUND OF THE INVENTION

Methods and systems for remotely controlling heating of at least one room of a building are generally known within the field of heating, ventilation and air conditioning (HVAC). Such systems are also known as control systems for HVAC devices or systems.

Known control systems for HVAC devices supporting scheduling of a heating procedure are configured to initiate the heating up of a room or building at a particular scheduled point of time at which an increased room air temperature is desired. This is not optimal as it does not take into account the heating inertia which usually causes the desired, higher room air temperature to be reached with a delay compared to the point of time at which the user desires this higher room air temperature.

Furthermore, for several decades manufacturers of HVAC devices have been attempting to make the devices more efficient. This is due to rising energy costs, and more recently also due to increased awareness of environmental issues. Even so there is still a desire to make such devices even more efficient. Therefore there is a need for a method and system for controlling a climate parameter, and particularly the temperature, of at least one room of a building, which may increase the efficiency of the HVAC device as a whole such as to save energy, costs and emissions of particularly greenhouse gases.

SUMMARY OF THE INVENTION

Based on this, it is the object of the present invention to provide a method and a corresponding system for controlling at least one climate parameter, including a first climate parameter, in at least one room of a building, which method and system is capable of taking into account the inertia inherently connected with inflicting a change of a climate parameter, and is capable of providing a more efficient and energy saving climate control process and/or an improved accuracy of a climate control process and/or an improved functionality of a climate control process.

According to a first aspect of the present invention this object is achieved by a method for controlling at least one climate parameter, including a first climate parameter, in at least one room of a building, the method comprising:

obtaining first information regarding the at least one climate parameter of the at least one room, the first information including first room specific measurements of the first climate parameter during at least one first climate control process, the at least one first climate control process including controlling the first climate parameter in the at least one room, based on the first room specific measurements of the first climate parameter providing or amending a correspondence indicator CI, such that the correspondence indicator comprises information indicative of a first rate of change of the first climate parameter within the at least one room during the at least one first climate control process, obtaining climate setting information including a desired first climate parameter value $C_1$ and a corresponding desired first time $t_1$ at which the desired first climate parameter value $C_1$ is desired to be present within the at least one room, obtaining, preferably measuring or estimating, a first starting value $V_1$ of the first climate parameter of the at least one room, based on the first correspondence indicator CI, the desired first time $t_1$, the first starting value $V_1$ of the first climate parameter and the desired first climate parameter value $C_1$ calculating a first measure $M_1$ for an amount of time $\Delta t$ needed to change the first climate parameter of the at least one room from the first starting value $V_1$ of the first climate parameter to the desired first climate parameter value $C_1$, and scheduling at least an initial part of a second climate control process of the first climate parameter of the at least one room as a first function $F_1$ of the first measure $M_1$.

Thereby a method is provided with which the inertia inherently connected with inflicting a change of a climate parameter is taken into account when scheduling a climate control process to increase or decrease, as the case may be, a first climate parameter in at least one room of a building. Thereby a method is provided with which the at least one room may reach the desired first climate parameter value $C_1$ substantially at the desired first time $t_1$. In this way the method according to the invention provides for a more efficient control of the first climate parameter, which in turn provides for the saving of energy and costs and/or improved accuracy and/or functionality.

According to a preferred embodiment the method further comprises obtaining second information regarding the first climate parameter of the at least one room, the second information including room specific measurements of the first climate parameter during the second climate control process, utilizing the second information to amend the correspondence indicator CI such that the correspondence indicator comprises information indicative of a second rate of change of the first climate parameter within the at least one room during the second climate control process, and utilizing the amended correspondence indicator CI for scheduling a climate control process being subsequent to the second climate control process.

By at least one time, preferably several times, and most preferably repeatedly, obtaining further information regarding the first climate parameter of the at least one room of the building and using the information to amend the correspondence indicator CI, a method is provided which takes into account the history of climate parameter changes related to the at least one room. Thereby a considerably higher degree of precision and consequently efficiency of the control of the first climate parameter may be obtained.

According to a preferred embodiment the method further comprises obtaining, preferably measuring, a second starting value $V_2$ of the first climate parameter of the at least one room, based on the first correspondence indicator CI, the desired first time $t_1$, the second starting value $V_2$ of the first climate parameter and the desired first climate parameter value $C_1$ calculating a second measure $M_2$ for a second amount of time needed to change the first climate parameter of the at least one room from the second starting value $V_2$ of the first climate parameter to the desired first climate parameter value $C_1$, and amending the scheduling of the second climate control process of the first climate parameter of the at least one room as a function of the second measure $M_2$.

According to a preferred embodiment the first function $F_1$ is defined such that the second climate control process is initiated at a first initiating time being about the amount of time $\Delta t$ before the desired first time $t_1$.

According to another preferred embodiment the first function $F_1$ is defined such that the second climate control process is initiated at a first initiating time being at least at the amount of time $\Delta t$ before the desired first time $t_1$, such as at least 110%, such as 120%, such as at least 150%, of the amount of time $\Delta t$ before the desired first time $t_1$.

By means of these measures a method is provided with which an even higher degree of precision of the control of the first climate parameter may be obtained, particularly as regards the point of time for initiation of a climate control process, where the preferred point in time for actuating a change of the first climate parameter may depend on a room temperature that may fluctuate after the calculation of the amount of time $\Delta t$ (and before the change is initiated).

According to a preferred embodiment the correspondence indicator CI comprises any one of an average rate of change of the first climate parameter within the at least one room during at least the at least one first climate control process, and a rate of change as a function of the actual value of the first climate parameter at the onset of at least the at least one first climate control process.

Thereby a method is provided with which an even higher degree of precision of the control of the first climate parameter may be obtained.

Particularly, in case the correspondence indicator CI comprises a rate of change as a function of the actual value of the first climate parameter at the onset of at least the at least one first climate control process, differences in the inertia inherently connected with inflicting a change of a climate parameter as a function of the size or value of the climate parameter may be taken into account. By way of example, if the climate parameter is the air temperature within the at least one room, it may in this way be taken into account that a heating from 20° C. to 25° C. may be faster than a heating from 22° C. to 27° C., which may particularly be the case if the outside temp is very low, such as lower than e.g. −10° C.

According to a preferred embodiment the method further comprises obtaining information regarding one or more appliances situated in the at least one room, such as e.g. information regarding power consumption, heat generation, cold generation, condensation and/or vaporization of/by the appliances, and wherein the information regarding appliances situated in the at least one room is included in the correspondence indicator CI.

Thereby a method is provided which takes into account possible influences on a climate parameter from such appliances contributing to the change of the climate parameter in the at least one room. Thereby a considerably higher degree of precision and consequently efficiency of the control of the first climate parameter may be obtained.

According to a preferred embodiment the method further comprises obtaining information regarding one or more of a temperature $T_{ext}$ outside the at least one room, particularly outside the building, a solar influx from outside the at least one room, particularly outside the building, to the at least one room, an air humidity $H_{ext}$ outside the at least one room, particularly outside the building wind conditions outside the building and draught to and/or from the at least one room and wherein the information regarding one or more of the temperature $T_{ext}$, the air humidity $H_{ext}$, the wind conditions outside the building and the draught to and/or from the at least one room is included in the correspondence indicator CI.

Thereby a method is provided which takes into account variations in conditions relating to the exterior surroundings of the at least one room, and particularly of the building, occurring due to e.g. change in weather conditions, such variations being known to greatly influence the climate parameters of the at least one room. Thereby a considerably higher degree of precision and consequently efficiency of the control of the first climate parameter may be obtained.

According to a preferred embodiment the first climate parameter is the air temperature within the at least one room, wherein the correspondence indicator CI is indicative of a rate of a change of temperature $\Delta T$ within the at least one room, and wherein $\Delta T$ is a constant being between 0, 5° C.

and 5° C., particularly between 1° C. and 3° C., more particularly between 1° C. and 2° C., and most particularly being 1° C.

Similarly, according to another preferred embodiment the first climate parameter is the air humidity within the at least one room, wherein the correspondence indicator CI is indicative of a rate of a change of humidity $\Delta H$ within the at least one room, and wherein $\Delta H$ is a constant being between 0, 5 and 5 percentage points, particularly between 1 and 3 percentage points, more particularly between 1 and 2 percentage points, and most particularly being 1 percentage point.

Thereby a method is provided with which a precise control of in principle any size of change of the first climate parameter of the at least one room may be obtained. Obviously, the smaller the values chosen for the rate of change of temperature $\Delta T$ and the rate of change of humidity $\Delta H$, respectively, are the better the precision of the control. However, experience and tests show that for most purposes a value for $\Delta T$ of 1° C. and/or a value for $\Delta H$ of 1 percentage point may fulfil most or all requirements.

According to a preferred embodiment the method further comprises obtaining information regarding energy prices, such as e.g. information regarding electricity prices or water prices, and the step of using the information regarding energy prices to for scheduling the second climate control process.

Thereby a method is provided which takes into account variations in energy prices over time, such energy prices being known to fluctuate greatly even within a given 24 hour interval. Thereby it becomes possible to suggest to the user a point of time to schedule an initiation of a climate control process at which point of time the energy to be used may be procured at a particularly advantageous price. Thereby the user is given the choice of cost optimizing the climate control of the at least one room or even his or hers whole building.

According to a second aspect of the present invention the above-mentioned objects and advantages is achieved by a system for controlling at least one climate parameter, including a first climate parameter, in at least one room of a building, the system comprising:

at least one sensor device obtaining first information regarding the at least one climate parameter of the at least one room, the first information including first room specific measurements of the first climate parameter during at least one first climate control process, the at least one first climate control process including controlling the first climate parameter in the at least one room, a first input element for obtaining climate setting information including a desired first climate parameter value $C_1$ and a corresponding desired first time $t_1$ at which the desired first climate parameter value $C_1$ is desired to be present within the at least one room, a second input element for obtaining, preferably measuring or estimating, a first starting value $V_1$ of the first climate parameter of the at least one room, a processing element for based on the first room specific measurements of the first climate parameter providing or amending a correspondence indicator CI, such that the correspondence indicator comprises information indicative of a first rate of change of the first climate parameter within the at least one room during the at least one first climate control process and for based on the first correspondence indicator CI, the desired first time $t_1$, the first starting value $V_1$ of the first climate parameter and the desired first climate parameter value $C_1$ calculating a first measure $M_1$ for an amount of time $\Delta t$ needed to change the first climate parameter of the at least one room from the first starting value $V_1$ of the first climate parameter to the desired first climate parameter value $C_1$, and a regulating element for scheduling at least an initial part of a second climate control process of the first climate parameter of the at least one room as a first function $F_1$ of the first measure $M_1$.

According to preferred further embodiments the system is adapted for performing a method according to any one of the embodiments according to the first aspect of the invention.

According to a third aspect of the present invention the above-mentioned objects and advantages is achieved by a method for controlling at least one climate parameter, including a first climate parameter, in at least one room of a building, the method comprising:

obtaining first information regarding the at least one climate parameter of the at least one room, the first information including first room specific measurements of the first climate parameter during at least one first climate control process, the at least one first climate control process including controlling the first climate parameter in the at least one room, based on the first room specific measurements of the first climate parameter providing or amending a correspondence indicator CI, such that the correspondence indicator comprises information indicative of a first rate of change of the first climate parameter within the at least one room during the at least one first climate control process, obtaining climate setting information including a desired first climate parameter value $C_1$ and a corresponding desired first time $t_1$ at which the desired first climate parameter value $C_1$ is desired to be present within the at least one room, obtaining a first starting value $V_1$ of the first climate parameter of the at least one room, and based on the first correspondence indicator CI, the desired first time $t_1$, the first starting value $V_1$ of the first climate parameter and the desired first climate parameter value $C_1$ calculating a first measure $M_1$ for an amount of time $\Delta t$ needed to change the first climate parameter of the at least one room from the first starting value $V_1$ of the first climate parameter to the desired first climate parameter value $C_1$.

BRIEF DESCRIPTION OF THE DRAWINGS

The invention will now be described in greater detail using non-limiting exemplary embodiments and with reference to the schematic drawings, on which:

In FIG. 6, the black line shows a scheduled value of the climate parameter as a function of time, such as known in the prior art. The black square on the black line illustrates a desired first climate parameter value and a corresponding desired first time at which the desired first climate parameter value is desired to be present according to the present invention. The grey line shows how the actual value of the climate parameter fluctuates naturally and by influence from a method and a system according to the invention as a function of time.

DETAILED DESCRIPTION OF THE INVENTION

Figure 1:
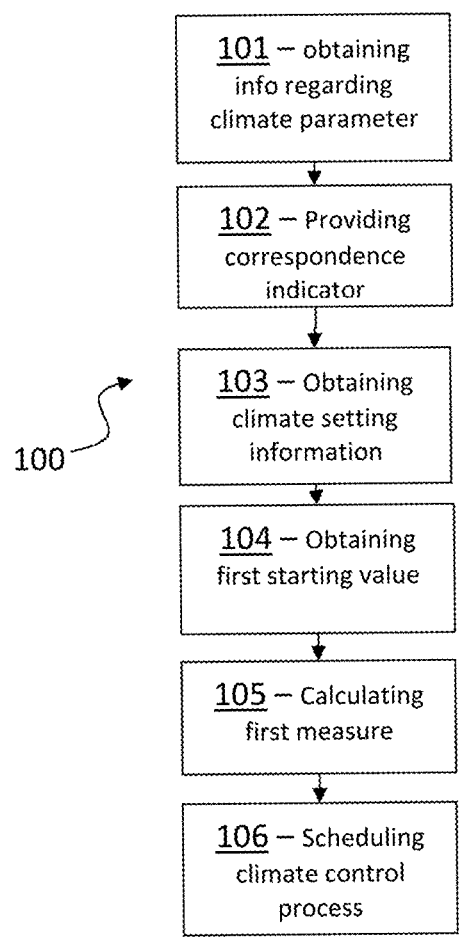
FIG. 1 is a schematic diagram illustrating the steps of an embodiment of a method according to the invention.

FIG. 1 shows an embodiment of a method 100 according to the invention for controlling at least one climate parameter, including a first climate parameter, in at least one room of a building. The method 100 is carried out as follows:

Initially, in step 101, first information regarding the at least one climate parameter of the at least one room is obtained. The first information includes, but is not limited to, first room specific measurements of the first climate parameter during at least one first climate control process. The at least one first climate control process may be a climate control process performed in advance of carrying out the method according to the invention, and it includes controlling the first climate parameter in the at least one room.

In step 102, a correspondence indicator CI is provided or amended based on the first room specific measurements of the first climate parameter, such that the correspondence indicator comprises information indicative of a first rate of change of the first climate parameter within the at least one room during the at least one first climate control process.

In step 103 climate setting information is obtained. The climate setting information includes, but is not limited to, a desired first climate parameter value $C_1$ and a corresponding desired first time $t_1$ at which the desired first climate parameter value $C_1$ is desired to be present within the at least one room.

In step 104 a first starting value $V_1$ of the first climate parameter of the at least one room is obtained, preferably by measurement or estimation.

In step 105 a first measure $M_1$ for an amount of time $\Delta t$ needed to change the first climate parameter of the at least one room from the first starting value $V_1$ of the first climate parameter to the desired first climate parameter value $C_1$ is calculated based on the first correspondence indicator CI, the desired first time $t_1$, the first starting value $V_1$ of the first climate parameter and the desired first climate parameter value $C_1$.

Finally, in step 106, at least an initial part of a second climate control process of the first climate parameter of the at least one room is scheduled as a first function $F_1$ of the first measure $M_1$.

Figure 6:
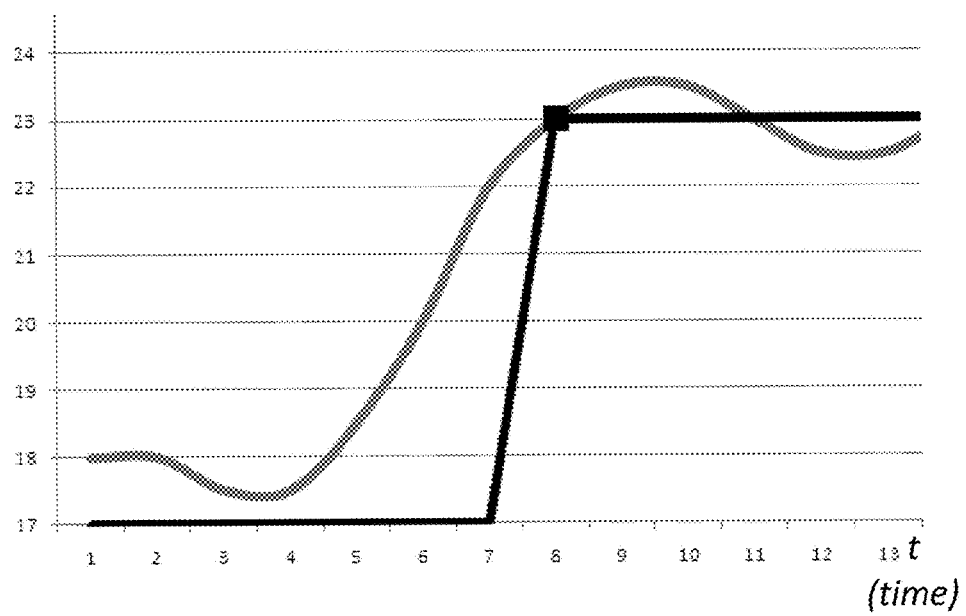
FIG. 6 is a graph illustrating the change of a climate parameter, the value of which is indicated on the y-axis as a function of time, the value of which is indicated on the x-axis.

In the following, and with reference to FIG. 6, an example will be described. In this example the climate parameter shown on the y-axis of the graph in FIG. 6 is the air temperature in ° C. of the at least one room, whereas the x-axis of the graph shows time in hours.

In this case the first information obtained in step 101 includes information regarding room specific measurements of the air temperature during at least one first climate control process. The correspondence indicator CI provided or amended in step 102 thus comprises information indicative of a first rate of change of the air temperature during the at least one first climate control process. The climate setting information obtained in step 103 includes as the desired first climate parameter value $C_1$ a desired air temperature of 23° C. and a corresponding desired point of time $t_1$ of 8:00 hours (8 AM) at which a user desires the room to have the desired air temperature of 23° C. This is indicated in FIG. 6 by the solid square in the graph at the coordinates (8, 23). In step 104, the first starting value $V_1$ of the first climate parameter indicates the measured or estimated actual air temperature of the at least one room at the time at which a climate control process is to be initiated. In step 105 the first measure $M_1$ is a measure for an amount of time $\Delta t$ needed to change the first climate parameter of the at least one room from the air temperature value obtained in step 104 to the desired air temperature included in the information obtained in step 103. A shown in FIG. 6, the amount of time $\Delta t$ is in the order of 4 hours.

Finally, the climate control process scheduled in step 106 may be a heating or a cooling of the at least one room. In the example illustrated in FIG. 6 a heating of the at least one room is thus scheduled to be initiated at 4:00 hours, corresponding to 8:00 hours minus $\Delta t$.

Alternatively, the climate parameter may be the air humidity of the at least one room.

Figure 2:
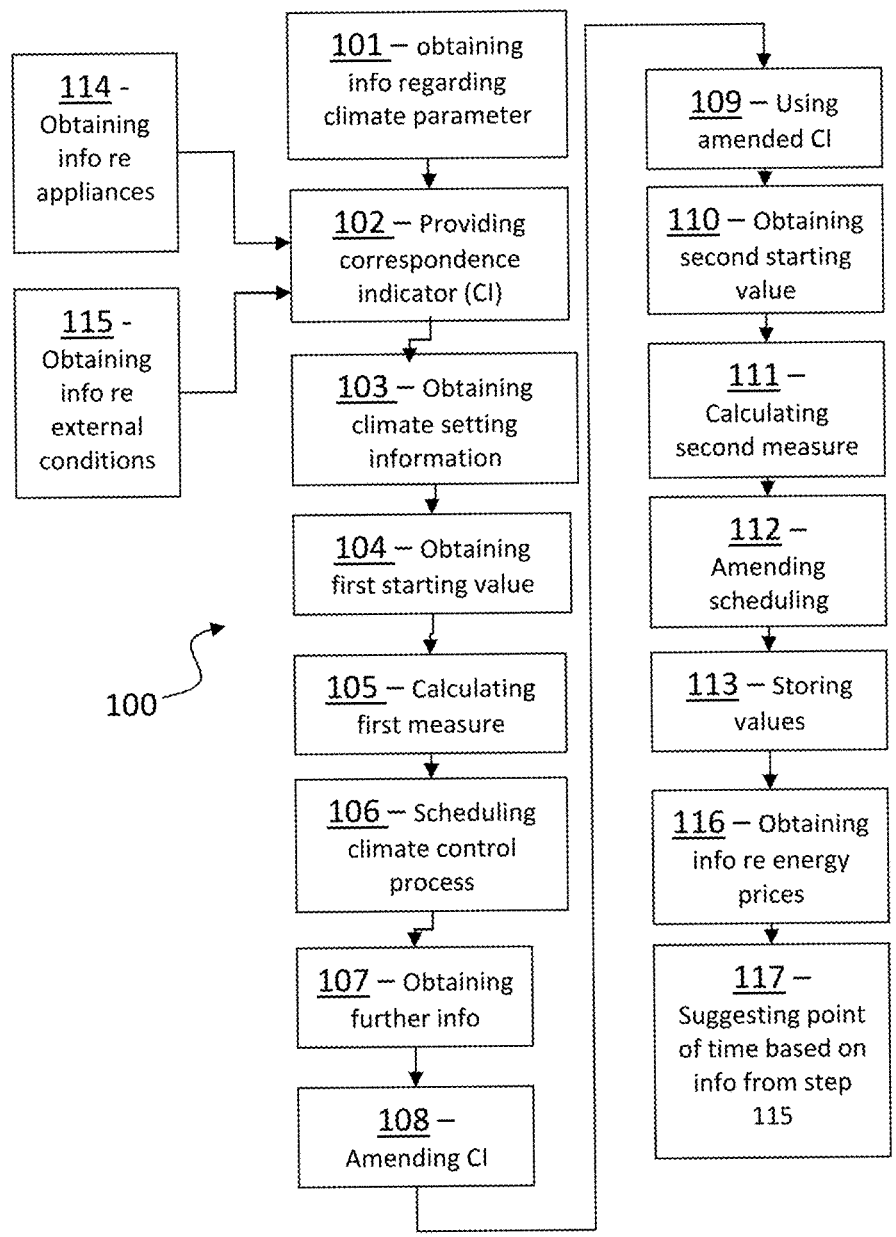
FIG. 2 is a schematic diagram illustrating the steps of a method according to another embodiment of the invention.

With reference now to FIG. 2, the method 100 according to the invention may furthermore comprise one or more of the optional steps or series of steps described below. It is noted that different combinations of these steps or series of steps may be carried out in different embodiments of the method, and that in different embodiments of the method only one or some of the steps or series of steps may be carried out. Hence the sequence of steps shown in FIG. 2 is intended as a non-limiting example only.

A first optional series of steps 107, 108, 109 are intended for using the previous climate control process history of steps 101 to 106 as additional information in a subsequent climate control process to improve the precision of the method for a subsequent climate control process. The first optional series of steps comprise in step 107 obtaining second information regarding the first climate parameter of the at least one room, the second information including room specific measurements of the first climate parameter during the second climate control process scheduled in step 106 above, in step 108 utilizing the second information obtained in step 107 to amend the correspondence indicator CI provided or amended in step 102 above, and in step 109 utilizing the amended correspondence indicator CI for scheduling a climate control process being subsequent to the second climate control process scheduled in step 106 above.

A second optional series of steps 110, 111, 112 are intended to enable taking into account changes in the conditions and particularly values employed in steps 101-106 above by improving the precision of the first starting value $V_1$ obtained in step 104 and are intended to be carried out during the scheduling procedure in step 106. By way of example, it may occur that the actual air temperature in the room changes subsequent to the scheduling performed in step 106, but before the actual climate control process (i.e. the actuation of a change of the first climate parameter) is initiated. Such a change affects the starting value $V_1$ and thus the measure $M_1$ for the amount of time $\Delta t$, which in turn gives rise to a need to reschedule the climate control process to obtain optimum precision.

The second optional series of steps 110, 111, 112 comprise in step 110 obtaining, preferably measuring, a second starting value $V_2$ of the first climate parameter of the at least one room, in step 111 calculating a second measure $M_2$ for a second amount of time needed to change the first climate parameter of the at least one room from the second starting value $V_2$ of the first climate parameter to the desired first climate parameter value $C_1$ based on the first correspondence indicator CI, the desired first time $t_1$, the second starting value $V_2$ of the first climate parameter and the desired first climate parameter value $C_1$, and in step 112 amending the scheduling of the second climate control process of the first climate parameter of the at least one room as a function of the second measure $M_2$.

Another optional step is a step 113 of storing any one or more of the different types of information and values obtained and/or calculated in other steps of the method in a memory. These values may be, but are not limited to, the information regarding the at least one climate parameter of the at least one room, the further information regarding the at least one climate parameter of the at least one room, the correspondence indicator CI, the desired first climate parameter value $C_1$, the desired first time $t_1$, the measured or estimated first starting value $V_1$ of the first climate parameter, the measured or estimated second starting value $V_2$ of the first climate parameter, the first measure $M_1$, the second measure $M_2$, the first function $F_1$, the second function $F_2$, and the amount of time $\Delta t$.

Such a memory may be an internal memory or an external memory, such as a cloud, or a combination thereof. Thereby the different types of information and values obtained and/or calculated in other steps of the method may be loaded and used in other steps of the method and/or in following passes of the method.

It is noted that the storing step 113 may be carried out once for all information that it is desired to store at a suitable point of time in the course of method, or alternatively two or more times for different pieces of information at different suitable points of time in the course of method.

Another optional step is a step 114 of obtaining information regarding one or more appliances situated in the at least one room, such as, but not limited to, information regarding power consumption, heat generation, cold generation, condensation and/or vaporization of/by the appliances. The information obtained in step 114 is included in the correspondence indicator CI provided or amended in step 102.

Another optional step is a step 115 of obtaining information regarding exterior climate conditions, such as, but not limited to, one or more of a temperature $T_{ext}$ outside the at least one room, particularly outside the building, a solar influx from outside the at least one room, particularly outside the building, to the at least one room, an air humidity $H_{ext}$ outside the at least one room, particularly outside the building wind conditions outside the building and draught to and/or from the at least one room. The information obtained in step 115 is included in the correspondence indicator CI.

A third optional series of steps 116, 117 are intended to improve the cost optimization even further. The third optional series of steps comprise in step 116 obtaining information regarding energy prices, such as e.g. information regarding electricity prices or water prices, and in step 117 using the information regarding energy prices in step 106 when scheduling the second climate control process for either automatically adjusting the schedule or for suggesting to a user a different point of time at which it is more cost efficient to schedule a climate control process.

Example—Controlling the Heating of a Room

The idea behind the method according to the invention as used in this example is to keep track of how long it takes to warm up the room and use this historical information to determine how long in advance the heating shall be started in order to reach a desired temperature at a desired time.

To determine $\Delta t$ indicating how long in advance of a desired time $t_1$ the heating shall be started, it is determined how long on average it historically takes to heat up the room by 1° C. This information is included in the correspondence indicator CI. Furthermore, to make the time calculation more accurate the system shall keep track of the external (outdoor) temperature at the location of the system and calculate a different time to heat up the room by 1° C. for different external temperature ranges e.g. in the following manner:

TABLE 1

| External Temperature Range [° C.] | Average Time to Heat up the zone by 1° C. [seconds] |
|---|---|
| <0 | 300 |
| 0-10 | 200 |
| 11-20 | 120 |
| 21-30 | 60 |
| >30 | 10 |

Table 1 may be amended by including information about the average time to heat up the zone (e.g. room) by 1° C. in dependence of the temperature of the zone.

The external temperature for the system may be acquired from an external web service providing weather condition information for a given location (eg. such as the Telvent web service). The location of the system can either be pre-configured in the system or automatically deducted using a GPS module on the system controller or from the IP address of the system controller. Alternatively or additionally, the external temperature may be provided by a local measurement, such as provided by a thermometer situated immediately outside the zone.

To further improve the precision for the calculation of the time it takes to heat up the room to a desired temperature, the temperature dissipation from the other room(s) surrounding the at least one room may be taken into account. In that case the method according to the invention comprises a step of obtaining information regarding the topology of the building, and correspondingly the information regarding the topology of the building may be pre-configured or stored in the system, such that for each room the neighboring rooms are known. In this way the method and the system is configured to keep track of the time it takes to heat up the room when the room has at least one neighboring room with an air temperature equal to or different from to the desired temperature.

In the following a system according to the invention shall be described with reference to FIGS. 3 and 4. Generally, such a system 1 is configured to carry out a method according to the invention and as described above.

Figure 3:
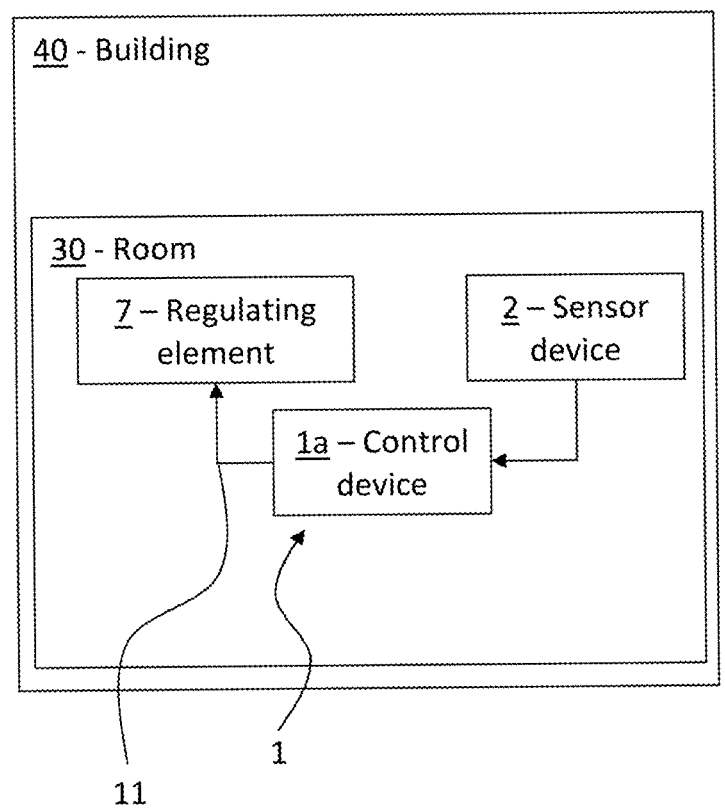
FIG. 3 is a schematic diagram illustrating a building with one room and equipped with an embodiment of a system according to the invention.

FIG. 3 shows a system 1 for controlling at least one climate parameter, including a first climate parameter, in at least one room 30 of a building 40. The system 1 comprises at least one sensor device for obtaining information regarding the at least one climate parameter of the at least one room 30. The sensor device preferably comprises a central receiving unit incorporated in a central unit or a main unit 1a of the system 1 and a sensor 2 arranged in the room 30 of the building 40 for detecting the at least one climate parameter. The sensor 2 may thus e.g. be a temperature sensor, a humidity sensor and/or any other feasible type of sensor or combinations thereof. The sensor 2 may be connected by wire or wirelessly to the main unit 1a of the system 1.

The system 1 further comprises a regulating element 7 for scheduling climate control process of the first climate parameter of the at least one room to be initiated e.g. the amount of time $\Delta t$ before the desired first time $t_1$, and for initiating the climate control process.

The main unit 1a and/or the regulating element 7 may comprise a suitable user interface adapted for receiving user input, such as a keyboard or a touch screen or the like and/or a receiving element for receiving information from internal or external sources such as the above mentioned sensor device.

In one embodiment the main unit 1a and/or the regulating element 7 may be incorporated in or connected to another unit adapted for mounting in a building. An example of such a unit is a smart plug such as those manufactured by the applicant under the name "Zelio Logic".

Figure 4:
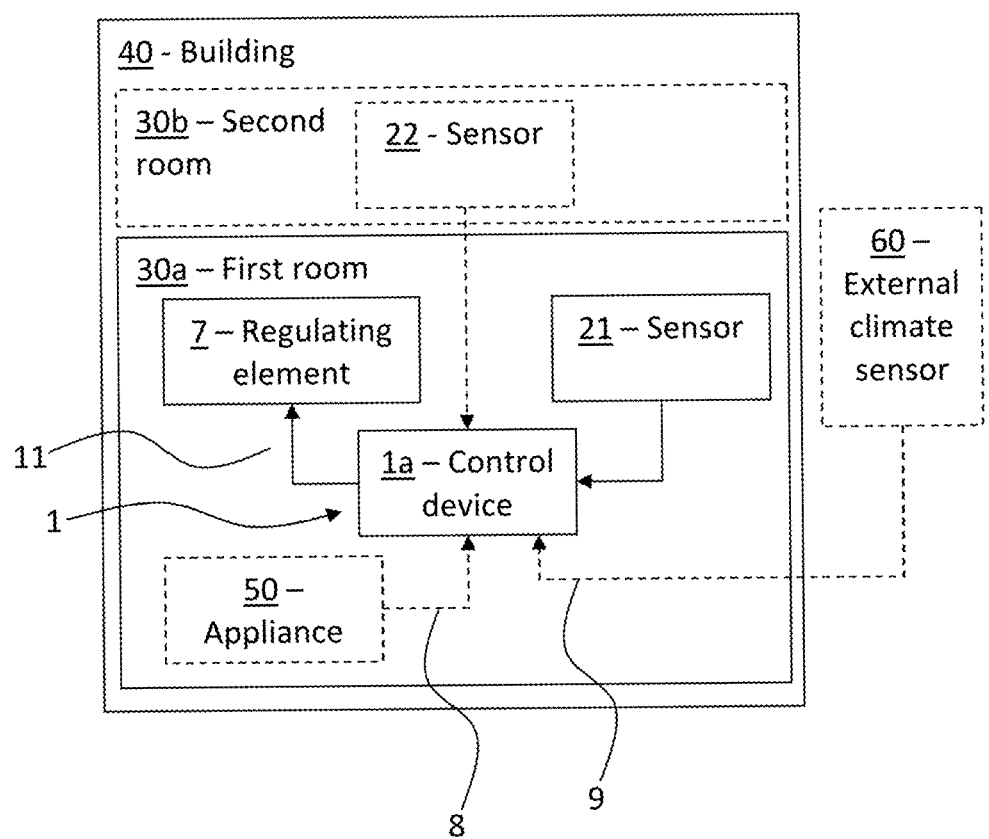
FIG. 4 is a schematic diagram illustrating a building with two rooms and equipped with another embodiment of a system according to the invention.

FIG. 4 shows a system 1 for controlling at least one climate parameter, including a first climate parameter, in two different rooms 30a, 30b of a building 40. The system 1 comprises at least one sensor device for obtaining information regarding the at least one climate parameter of the at least one room. The sensor device preferably comprises a central receiving unit incorporated in a central unit or a main unit 1a of the system 1 and two sensors 21, 22 arranged in each of the two rooms 30a, 30b of the building 40 for detecting the at least one climate parameter in each room 30a, 30b. The sensors 21, 22 may thus e.g. be temperature sensors, humidity sensors and/or any other feasible type of sensors or combinations thereof. In this way the system 1 may not only control the at least one climate parameter in one or both rooms 30a 30b, but may also take into account the at least one climate parameter or indeed other conditions related thereto of the one room 30b or 30a when controlling the at least one climate parameter of the respective other room 30a or 30b.

The system 1 further comprises a first input element (not shown on FIG. 4) for obtaining information regarding a desired first climate parameter value $C_1$ and a corresponding desired first time $t_1$ at which the desired first climate parameter value $C_1$ is desired to occur, as well as a second input element (not shown on FIG. 4) for obtaining, preferably measuring or estimating, a starting value $C_0$ of the first climate parameter of the two rooms 30a, 30b. In the embodiment shown (cf. also FIG. 5) the first and second input elements are incorporated in the main unit 1a but may alternatively be separate units connected wirelessly or by wire to the main unit 1a. In this case the central receiving unit of the sensor device may be omitted.

Preferably one of the first and second input elements is a suitable user interface adapted for receiving user input, such as a keyboard or a touch screen or the like, while the other input element is a receiving element for receiving information from internal or external sources such as the above mentioned sensor unit.

Alternatively, the system 1 may comprise just one input element adapted for obtaining all information desired and needed or several input elements each adapted for obtaining one or more specific types of information.

The first and/or second input elements may additionally or alternatively be adapted for obtaining other information needed, such as information regarding appliances, external conditions and energy prices as described above in relation to the method according to the invention.

However, in the embodiment shown in FIG. 4, the system 1 comprises a separate element 8 for obtaining information regarding appliances 50 and another separate element 9 for obtaining information regarding external conditions from an external climate parameter sensor 60 arranged outside the building 40. The elements 8 and 9 may be wires for transmitting signals or alternatively a wireless transmit/receive arrangement.

The system 1 shown in FIG. 4 further comprises a regulating element 7 for scheduling a climate control process of the first climate parameter of the at least one room to be initiated e.g. the amount of time Δt before the desired first time $t_1$. The regulating element 7 and the main unit is connected wirelessly or by wire by means of an output element 11 for transmitting information regarding the scheduling of a climate control process to the regulating element 7.

The regulating element 7 may e.g. be at least one controllable climate actuator including a first climate actuator configured to control the first climate parameter within the at least one room 30a, 30b.

Obviously, the system may be expanded to be adapted to buildings comprising more than two rooms, particularly by comprising a plurality of sensors, at least one sensor being arranged in each room of the building.

Figure 5:
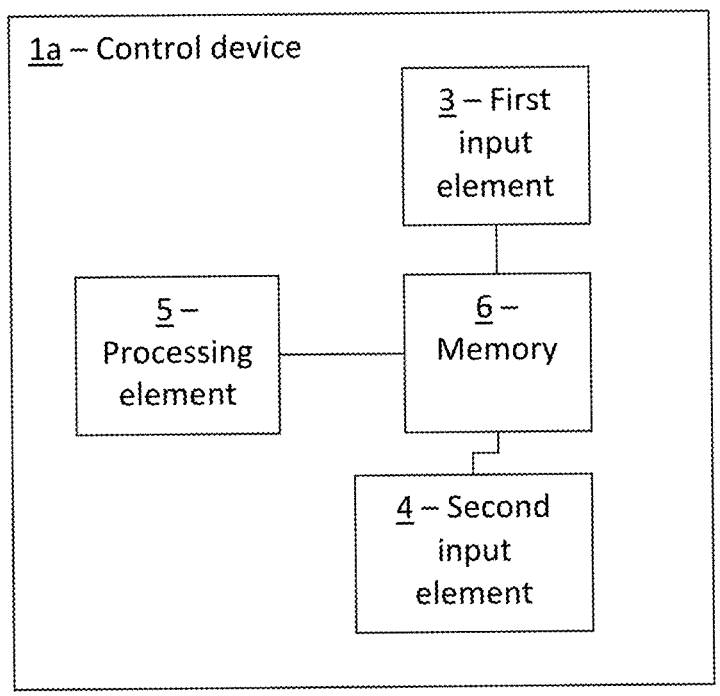
FIG. 5 is a schematic diagram illustrating a central unit or main unit of a system according to the invention.

Turning now to FIG. 5 an embodiment of the main unit 1a of the system 1 is illustrated. The main unit 1a comprises a processing element 5 and a memory 6.

The processing element 5 is adapted to perform all calculations needed, including based on the first room specific measurements of the first climate parameter providing or amending a correspondence indicator CI, based on the first correspondence indicator CI, the desired first time $t_1$, the first starting value $V_1$ of the first climate parameter and the desired first climate parameter value $C_1$ calculating a first measure $M_1$ for an amount of time Δt needed to change the first climate parameter of the at least one room from the first starting value $V_1$ of the first climate parameter to the desired first climate parameter value $C_1$.

The memory 6 is provided for storing any one or more of the obtained and/or calculated different types of information and values. Thereby, the system 1 is enabled to load this information from the memory 6 and take into account the information and values at a later point of time.

As mentioned above, the main unit 1a of the system 1 may further comprise input elements for obtaining various information, such as a first input element 3 for obtaining information regarding a desired first climate parameter value $C_1$ and a corresponding desired first time $t_1$ at which the desired first climate parameter value $C_1$ is desired to occur, as well as a second input element 4 for obtaining, preferably measuring or estimating, a starting value $C_0$ of the first climate parameter of the room 30 or the two rooms 30a, 30b.

The different elements of the system 1 may be connected wirelessly and/or by means of wired connections.

Generally speaking and in further embodiments the system 1 is adapted for performing a method according to any one of the embodiments described herein and in the dependent method claims.

The method and system according to the invention may be employed to control a climate parameter in just one specific room of a building, or alternatively the method and system according to the invention may be employed to control a climate parameter in two or more specific rooms, and particularly all rooms, of a building independently (and/or independence) of one another.

The method according to the invention may be adapted to be performed by remote control. Correspondingly, the system according to the invention may comprise a remote control device (not shown) for remote controlled actuation and/or operation of the system by a user such as an inhabitant or an owner of the building, a caretaker/janitor or even a supplier of for instance electricity, water or heat.

In the above the present invention has been described based on embodiments. It will be apparent for the skilled person that numerous variations are possible without deviating from the scope of the invention as laid down in the appended claims.

The invention claimed is:

1. A method for controlling at least one climate parameter, including a first climate parameter, in at least one room of a building, performed by a climate control system, the method comprising:
   obtaining first information regarding the at least one climate parameter of the at least one room, the first information including first room specific measurements of the first climate parameter during at least one first climate control process, the at least one first climate control process including controlling the first climate parameter in the at least one room,
   based on the first room specific measurements of the first climate parameter providing or amending a correspondence indicator CI, such that the correspondence indicator CI comprises information indicative of a first rate of change of the first climate parameter within the at least one room during the at least one first climate control process,
   obtaining climate setting information including a desired first climate parameter value $C_1$ and a corresponding desired first time $t_1$ at which the desired first climate parameter value $C_1$ is desired to be present within the at least one room,
   measuring a first starting value $V_1$ of the first climate parameter of the at least one room,
   calculating, based on the first correspondence indicator CI, the desired first time $t_1$, the first starting value $V_1$ of the first climate parameter and the desired first climate parameter value $C_1$, a first measure $M_1$ for an amount of time $\Delta t$ needed to change the first climate parameter of the at least one room from the first starting value $V_1$ of the first climate parameter to the desired first climate parameter value $C_1$,
   converting the climate control system into a more precise climate control system by dynamically scheduling a time at which to perform at least an initial part of a second climate control process for changing a value of the first climate parameter in the at least one room as a first function $F_1$ of the first measure $M_1$, whereby the climate control system is configured to automatically control an environment of the at least one room;
   wherein the first function $F_1$ is defined such that the second climate control process is initiated at a first initiating time being at least at the amount of time $\Delta t$ before the desired first time $t_1$; and
   wherein the amount of time $\Delta t$ before the desired first time $t_1$ is selected from the group comprising 110% or more, 120% or more, and 150% or more of the amount of time $\Delta t$ before the desired first time $t_1$.

2. The method according to claim 1, further comprising:
   obtaining second information regarding the first climate parameter of the at least one room, the second information including room specific measurements of the first climate parameter during the second climate control process,
   utilizing the second information to amend the correspondence indicator CI, such that the correspondence indicator CI comprises information indicative of a second rate of change of the first climate parameter within the at least one room during the second climate control process, and
   utilizing the amended correspondence indicator CI for scheduling a climate control process being subsequent to the second climate control process.

3. The method according to claim 1, wherein an initial part of the second climate control process comprises
   obtaining a second starting value $V_2$ of the first climate parameter of the at least one room,
   calculating, based on the first correspondence indicator CI, the desired first time $t_1$, the second starting value $V_2$ of the first climate parameter and the desired first climate parameter value $C_1$, a second measure $M_2$ for a second amount of time needed to change the first climate parameter of the at least one room from the second starting value $V_2$ of the first climate parameter to the desired first climate parameter value $C_1$, and
   amending the scheduling of the second climate control process of the first climate parameter of the at least one room as a function of the second measure $M_2$.

4. The method according to claim 3, further comprising the step of storing any one or more of the first information regarding the at least one climate parameter of the at least one room, the second information regarding the at least one climate parameter of the at least one room, the correspondence indicator CI, the desired first climate parameter value $C_1$, the desired first time $t_1$, the measured or estimated first starting value $V_1$ of the first climate parameter, the measured or estimated second starting value $V_2$ of the first climate parameter, the first measure $M_1$, the second measure $M_2$, the first function $F_1$, a second function $F_2$, and the amount of time $\Delta t$ in a memory, the memory being one or more of an internal memory and an external memory.

5. The method according to claim 1, wherein the first function $F_1$ is defined such that the second climate control process is initiated at a first initiating time being about the amount of time $\Delta t$ before the desired first time $t_1$.

6. The method according to claim 1, wherein the correspondence indicator CI comprises any one of an average rate of change of the first climate parameter within the at least one room during at least the at least one first climate control process, and a rate of change as a function of the actual value of the first climate parameter at the onset of at least the at least one first climate control process.

7. The method according to claim 1, wherein the first climate parameter comprises any one or more of the air temperature within the at least one room and the air humidity within the at least one room.

8. The method according to claim 1, wherein the method further comprises
   obtaining information regarding one or more appliances situated in the at least one room during the at least one first climate control, the second climate control, or both of the at least one first climate control and the second climate control, and
   wherein the information regarding appliances situated in the at least one room is included in the correspondence indicator CI.

9. The method according to claim 8, wherein the information regarding one or more appliances situated in the at least one room during the at least one first climate control or the second climate control is selected from the group comprising information regarding power consumption, heat generation, cold generation, condensation and vaporization of/by the appliances.

10. The method according to claim 1, wherein the method further comprises
    obtaining during the at least one first climate control, the second climate control, or both of the at least one first climate control and the second climate control information regarding one or more of a temperature $T_{ext}$ outside the at least one room, a solar influx from outside the at least one room to the at least one room, an air humidity $H_{ext}$ outside the at least one room, wind conditions outside the building, and draught to and from the at least one room and wherein the information regarding one or more of the temperature $T_{ext}$, the solar influx, the air humidity $H_{ext}$, the wind conditions outside the building and the draught to and from the at least one room is included in the correspondence indicator CI.

11. The method according to claim 1, wherein the first climate parameter is the air temperature within the at least one room, wherein the correspondence indicator CI is indicative of a rate of a change of the air temperature $\Delta T$ within the at least one room, and wherein $\Delta T$ is a constant being between 0.5° C. and 5° C.

12. The method according to claim 11, wherein $\Delta T$ is a constant being 1° C.

13. The method according to claim 1, wherein the first climate parameter is the air humidity within the at least one room, wherein the correspondence indicator CI is indicative of a rate of a change of the air humidity $\Delta H$ within the at least one room, and wherein $\Delta H$ is a constant being between 0.5 and 5 percentage points.

14. The method according to claim 13, wherein $\Delta H$ is a constant being 1 percentage point.

15. The method according to claim 1, wherein the method further comprises:
obtaining information regarding energy prices and the step of using the information regarding energy prices to for scheduling the second climate control process.

16. A climate control system for controlling at least one climate parameter, including a first climate parameter, in at least one room of a building, the climate control system comprising:
at least one sensor device obtaining first information regarding the at least one climate parameter of the at least one room, the first information including first room specific measurements of the first climate parameter during at least one first climate control process, the at least one first climate control process including controlling the first climate parameter in the at least one room,
a first input element, the first input element being configured to obtain a first input in the form of climate setting information including a desired first climate parameter value $C_1$ and a corresponding desired first time $t_1$ at which the desired first climate parameter value $C_1$ is desired to be present within the at least one room,
a second input element, the second input element being configured to measure a second input in the form of a first starting value $V_1$ of the first climate parameter of the at least one room,
a processing element, the processing element being configured to, based on the first room specific measurements of the first climate parameter, provide or amend a correspondence indicator CI, such that the correspondence indicator comprises information indicative of a first rate of change of the first climate parameter within the at least one room during the at least one first climate control process and to calculate, based on the first correspondence indicator CI, the desired first time $t_1$, the first starting value $V_1$ of the first climate parameter and the desired first climate parameter value $C_1$, a first measure $M_1$ for an amount of time $\Delta t$ needed to change the first climate parameter of the at least one room from the first starting value $V_1$ of the first climate parameter to the desired first climate parameter value $C_1$, and
a regulating element, the regulating element being configured to convert the climate control system into a more precise climate control system by dynamically scheduling a time at which to perform at least an initial part of a second climate control process for changing a value of the first climate parameter in the at least one room as a first function $F_1$ of the first measure $M_1$, whereby the climate control system is configured to automatically control an environment of the at least one room;
wherein the first function $F_1$ is defined such that the second climate control process is initiated at a first initiating time being at least at the amount of time $\Delta t$ before the desired first time $t_1$; and
wherein the amount of time $\Delta t$ before the desired first time $t_1$ is selected from the group comprising 110% or more, 120% or more, and 150% or more of the amount of time $\Delta t$ before the desired first time $t_1$.

17. A method for controlling at least one climate parameter, including a first climate parameter, in at least one room of a building, performed by a climate control system, the method comprising:
obtaining first information regarding the at least one climate parameter of the at least one room, the first information including first room specific measurements of the first climate parameter during at least one first climate control process, the at least one first climate control process including controlling the first climate parameter in the at least one room,
based on the first room specific measurements of the first climate parameter providing or amending a correspondence indicator CI, such that the correspondence indicator comprises information indicative of a first rate of change of the first climate parameter within the at least one room during the at least one first climate control process,
obtaining climate setting information including a desired first climate parameter value $C_1$ and a corresponding desired first time $t_1$ at which the desired first climate parameter value $C_1$ is desired to be present within the at least one room,
measuring a first starting value $V_1$ of the first climate parameter of the at least one room, and
calculating, based on the first correspondence indicator CI, the desired first time $t_1$, the first starting value $V_1$ of the first climate parameter and the desired first climate parameter value $C_1$, a first measure $M_1$ for an amount of time $\Delta t$ needed to change the first climate parameter of the at least one room from the first starting value $V_1$ of the first climate parameter to the desired first climate parameter value $C_1$;
wherein the climate control system is converted into a more precise climate control system by dynamically scheduling a time at which to perform a second climate control process for changing a value of the first climate parameter in the at least one room based on the first measure $M_1$, whereby the climate control system is configured to automatically control an environment of the at least one room; and
wherein the amount of time $\Delta t$ before the desired first time $t_1$ is selected from the group comprising 110% or more, 120% or more, and 150% or more of the amount of time $\Delta t$ before the desired first time $t_1$.

\* \* \* \* \*